Sept. 25, 1956 R. C. CARLSON 2,764,415

PHONOGRAPH RECORD PLAYER

Original Filed July 29, 1948 5 Sheets-Sheet 1

Inventor
REUBEN C. CARLSON

By J. D. Douglas
His Attorney

Sept. 25, 1956 R. C. CARLSON 2,764,415

PHONOGRAPH RECORD PLAYER

Original Filed July 29, 1948 5 Sheets-Sheet 2

By REUBEN C. CARLSON

J. D. Douglas
Attorney

Sept. 25, 1956 R. C. CARLSON 2,764,415

PHONOGRAPH RECORD PLAYER

Original Filed July 29, 1948 5 Sheets-Sheet 3

REUBEN C. CARLSON

By J. Douglas

His Attorney

Sept. 25, 1956 R. C. CARLSON 2,764,415

PHONOGRAPH RECORD PLAYER

Original Filed July 29, 1948 5 Sheets-Sheet 4

REUBEN C. CARLSON

By J. W. Douglas
His Attorney

Inventor
REUBEN C. CARLSON
By J. W. Douglas
His Attorney

United States Patent Office 2,764,415

Patented Sept. 25, 1956

2,764,415

PHONOGRAPH RECORD PLAYER

Reuben C. Carlson, River Grove, Ill., assignor to Admiral Corporation, Chicago, Ill., a corporation of Delaware Original application July 29, 1948, Serial No. 41,388. Divided and this application August 22, 1951, Serial No. 243,056

8 Claims. (Cl. 274—10)

This invention relates to phonograph record changers, and more particularly to apparatus for manipulating the tone arm of such a changer. The present application is a division of my original and copending application, Ser. No. 41,388, filed July 29, 1948.

In the parent application, of which this is a division, is disclosed a record changer adapted to play records singly as they are delivered to a turntable. After playing, each record is removed from the turntable and another replaces it. The transfer mechanism is so constructed that either a ten-inch or twelve-inch record may be transferred without necessity for any adjustment.

It therefore is necessary to have means to operate the pickup arm which will sense the diameter of the record on the turntable and position the arm accordingly. The present invention accomplishes that purpose. The sensing means is a contactor element engaged by a 12-inch but not by a 10-inch record. This element controls a movable switching arrangement on the lateral-action cam which causes the pickup arm to move laterally. This switch determines which of two paths a follower shall take, thereby defining the motion of the arm to the edge of either record depending on the contactor.

A more complete understanding of the invention may be had by referring to the accompanying drawings and description which form a part of this specification.

Figs. 7–10 inclusive are top plan views, partly diagrammatic, which show four different steps in the manipulation of the pickup arm.

Figures 2, 3, 4, 5, 6:
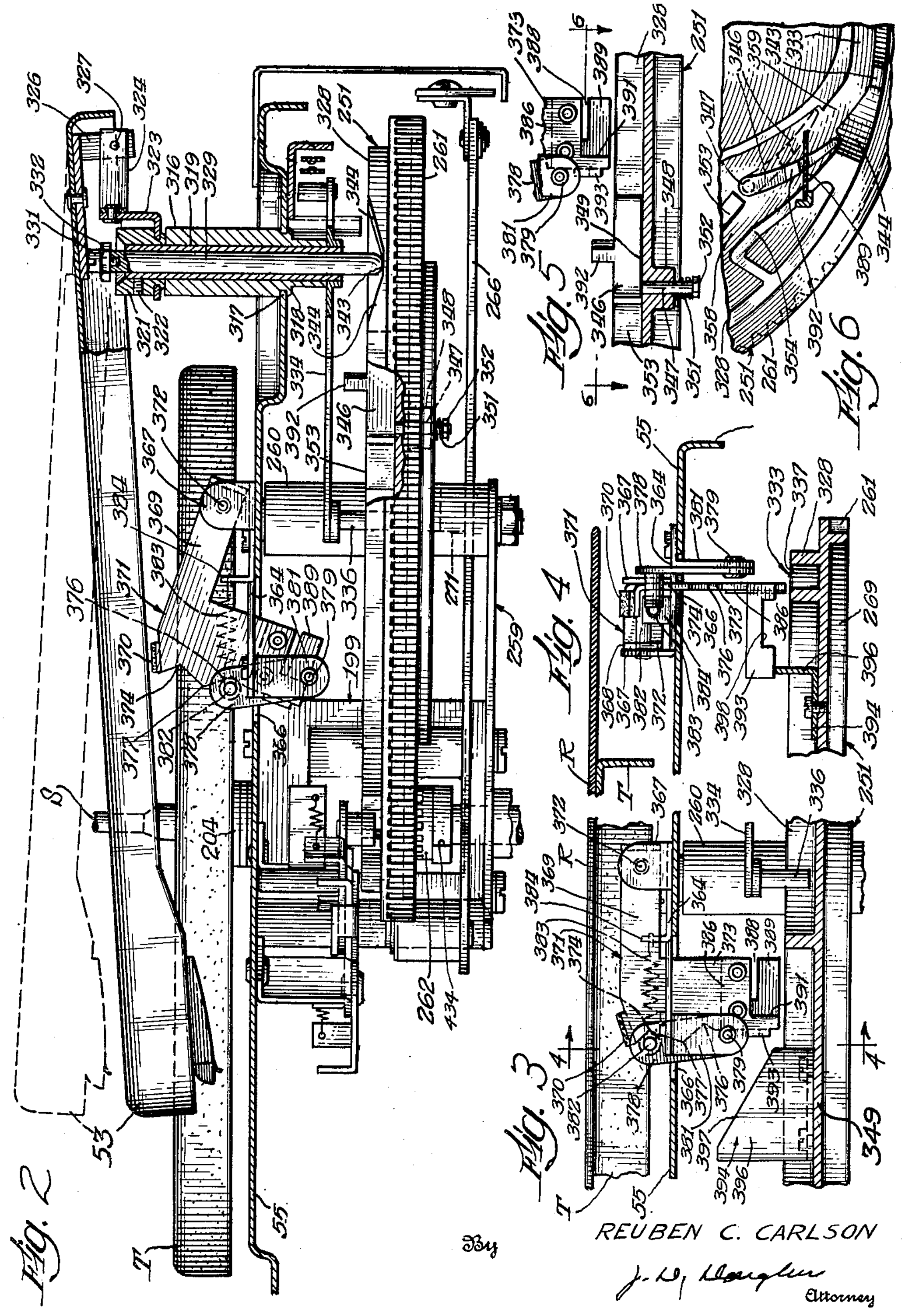
Fig. 2 is a sectional view along line 2—2 of Fig. 1.
Fig. 3 is a partial view similar to Fig. 2, the parts having been moved to a second position.
Fig. 4 is a sectional view from line 4—4 of Fig. 3.
Fig. 5 is a detailed fragmentary view partly in section, of structure shown in Fig. 2.
Fig. 6 is a sectional view from line 6—6 of Fig. 5.
Figures 15, 16, 17, 18, 19:
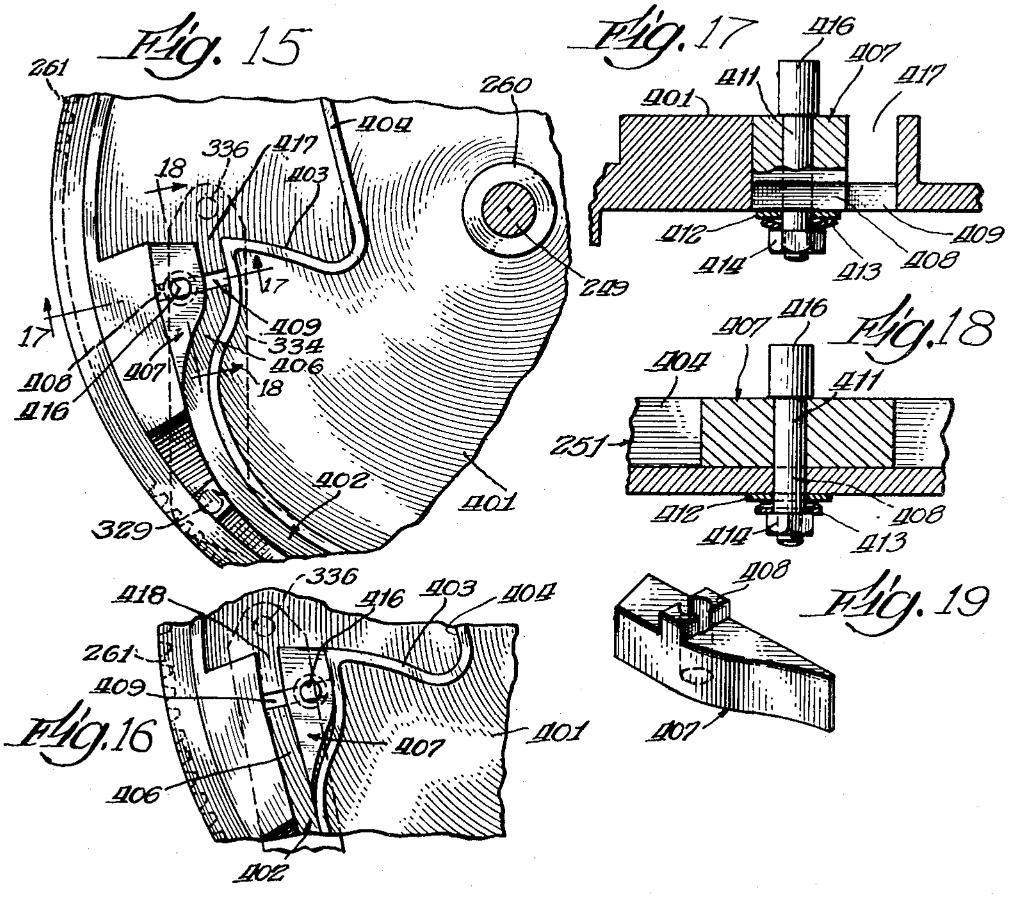

Figs. 11–14 inclusive are views partly in side elevation and partly in section, corresponding to views 7—10 respectively showing the vertical movements of the pickup arm and related parts;

Fig. 15 is a top plan view of a form of track switch alternative to that shown in Fig. 6;

Fig. 16 is a view of a part of Fig. 15 with the switch in a second position;

Fig. 17 is a vertical sectional view taken from lines 17—17 of Fig. 15;

Fig. 18 is a vertical sectional view from line 18—18 of Fig. 15; and

Fig. 19 is a perspective view of the switch member in an inverted position.

My present invention comprises a part of a phonograph record changer as more fully described in my aforesaid co-pending application, this being a division thereof. As there disclosed, the changer included a magazine and means to transfer a record from the magazine to a turntable. The turntable, designated generally by the letter T, has a hub 204 and fixed thereto a tubular shaft 206 journalled in bearings (not shown) mounted in the base plate 55. The shaft 206 surrounds a spindle S and the turntable is driven thereabout by a drive means of any preferred type which drives on the rim of the turntable.

Below the base plate 55 this shaft or sleeve 206 carries a pinion 262 (Figs. 1 and 2) and, at a level still lower, a pair of winged drivers 434 extend therefrom. This shaft is journalled in a bearing frame 199 mounted on the under side of the base plate 55. Adjacent the pinion 262 a cam wheel 251 is mounted, having a hub 260 journalled on a shaft 249 fixed to the base plate, and supported additionally by a bracket 259. At the periphery of this wheel is formed a gear 261 adapted to mesh with the pinion 262, but having a gap 263 in the teeth. The gap is normally stationed adjacent the pinion thus holding the gear out of driven engagement with the pinion. Trigger means 470 fully described in the parent application, are provided to move the gear into meshing engagement with the pinion. A cam track 269 in which a follower 271 is engaged operates a lever 266 to manipulate the record changing mechanism.

Means to govern the position of the pickup arm 53 with respect to the turntable T are provided. The means includes use of a tubular column 316 (Fig. 2) having at the base thereof a section 317, of reduced diameter passing through the base plate 55, the section 317 being rolled over or riveted at 318. The column 316 is thus held in vertical relationship to the plate 55 so that a sleeve 319, journalled within the column, is rotatable about a vertical axis and is anchored against downward displacement by a coupling 321 adjustably secured to the sleeve by a set screw 322. The coupling 321 bears an outwardly and upwardly extending arm 323 from the end of which a pair of arms 324, formed of spring metal, are supported and extend outward. From the top of the pickup arm 53 a pair of arms 326 extend downwardly to embrace the arms 324 and with which they are in pivoted relationship by a pin 327 passing horizontally through the two pairs of arms. The column 316 is so positioned with respect to an angular and vertical motion cam 328, on the cam wheel 251, that a lift rod 329, journalled centrally of the sleeve 319 and adapted to rest against the cam 328, is adapted to be moved axially by said cam when it is rotated. At the upper end thereof, the rod 329 carries an adjustment screw 331 threaded in the rod. The screw 331 and rod 329 being adapted to sustain the pickup arm 53 as its weight urges it downwardly about the pin 327, it follows that differences in the height of the cam 328 are adapted to swing the pickup arm about said pin. The screw 331, of course, provides for vertical adjustment of the needle and of the pickup arm while provision for maintaining such an adjustment involves use of a lock nut 332, on the screw, which is adapted to be clamped against rod 329.

Figure 1:
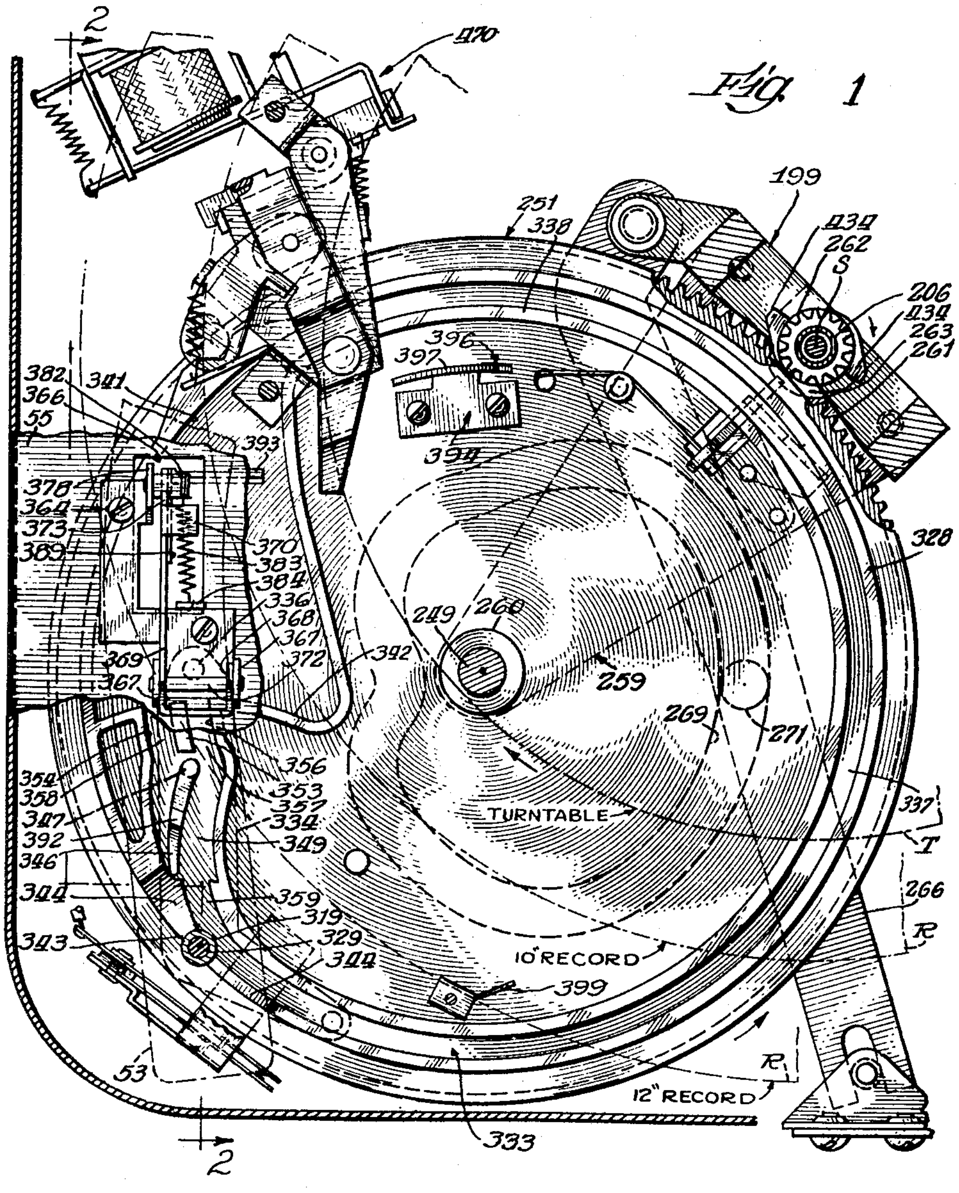
Fig. 1 is a top plan view of the pickup-arm manipulating mechanism, most of the base plate being broken away to show the underlying parts.

The pickup arm 53 is adapted to be swung laterally by means including a lateral motion cam 333 (Figs. 1 and 2) adjacent the cam 328 and preferably forming an integral part of the cam wheel 251. In order that motion provided by the cam 333 may be imparted to the pickup arm, the lower end of the sleeve 319 has, rigidly fastened thereto and extending radially thereof, a cam arm 334 which carries at its swinging end a downwardly extending follower 336 adapted to be operably engaged by the cam 333. As will be noted, the cam 333 takes the form of a groove 337 only wide enough, for the greater part of its length, to accommodate the follower 336. At one extremity thereof, one of the opposed vertical walls of the groove 337, namely, an inner wall 338, diverges as at 339 from an opposed or outer wall 341 and extends toward a region centrally of the wheel 251 to a wall section 342. During the operation of reproducing a record, in which the wheel 251 is in a normal position, the follower 336 is adjacent the wall 342, which wall is arcuate to provide clearance and free movement for the follower (Fig. 1). Also during its normal position, and until the needle of the pickup arm reaches the end of the sound groove of the record being reproduced, the follower 336 is remote from the wall section 339. At the same time the lift rod 329 rests against a dwell or depression 343 in the vertical motion cam 328. When, however, the pickup arm reaches the end of the sound groove of a record, and wherein the follower 336 has closely approached the wall section 339, a trip mechanism, described in my aforementioned co-pending application, starts the wheel 251 rotating counterclockwise. This causes the lift rod 329 to ride up the inclined surfaces 344, one of which extends from either side of the dwell 343 to the top of the cam. In so doing, the lift rod 329 rocks the pickup arm about the pin 327 thus disengaging the pickup arm from the record just engaged. When the pickup arm is free of the record, the follower 336 is then engaged by the wall section 339 against which the follower is forced to slide by rotation of the wheel 251 until said follower enters the groove 337 where it is confined between the walls 338 and 341. Since the follower 336 is swung in a direction away from shaft 249 by the wall section 339, the pickup arm 53 is also swung away from the spindle S until at the position where follower 336 is in the groove 337, the pickup arm occupies a position sufficiently remote from the turntable to allow a record to be transferred thereto or removed therefrom without striking the pickup arm. During the interval of time which it is necessary for the pickup arm to be free of a record, the lift rod rests on the top of the cam 328, which is of uniform height throughout its surface except at the dwell 343 and inclined surfaces 344. Also while the follower 336 is in the groove 337, the lever 266 is operated by the cam 269 thereby providing for removal of the played record from the turntable and replacing it with an unplayed record.

A track switch 346 (Figs. 1 and 2) is employed to determine the "let-down" position of the pickup arm; that is, the operation of lowering the pickup needle into engagement with the beginning of the sound groove of an unplayed 10- or 12-inch record. Since the let-down of the pickup for a 12-inch record is at variance with the let-down for a 10-inch record, it follows that when the wheel stops turning, automatically, on completion of a cycle of rotation and occupies a normal position, the follower 336 must occupy either of two possible positions depending on whether a 10-inch or 12-inch record is on the turntable. Therefore, it is in accordance with the construction and operation of the mechanism that the track switch or gate 346 normally occupies the position indicated in Fig. 1 wherein the switch is set for manipulation of the pickup arm with respect to 10-inch records.

In detail, the switch is generally arcuate in formation and includes a downwardly extending pin 347 (Fig. 5) which is journalled in a boss 348, an integral part of the wheel 251. Since it is desirable that just enough friction be provided between the switch 346 and a web portion 349 of the wheel 251, a suitable compression spring 351 on the pin 347 is provided between a nut 352 on the lower end of the pin and the boss 348. The switch 346 is pivoted to the web 349 in close proximity to a baffle 353 upstanding from the web. Furthermore, the baffle 353 is disposed midway between opposed vertical walls 354 and 356 rising from the web 349, thereby providing channels or end grooves 357 and 358 just wide enough to operably accommodate the follower 336. Additionally, one end of the baffle 353 extends, substantially, to the arc defining the wall surface 342. As the follower is guided by the groove 333, during a record changing cycle, it is directed toward the shaft 249 by an inwardly directing or return portion 359, of the groove 333, in the proximity of the switch 346 against which the follower strikes only to be deflected thereby into the groove portion 357. When the follower 336 emerges from the groove portion 357, the wheel 251 automatically stops, due to the notch 263 reaching a point beside the pinion 262. At the same time that the follower 336 passes through groove 357, one of the inclined surfaces 344 (Fig. 2) passes under the lift rod 328, thereby allowing the pickup to rock downwardly by its own weight. A 10-inch record being on the turntable at the time, the pickup arm engages the beginning of its sound groove, owing to the angular relationship between the arm and follower 336. The follower 336 then being free from the groove 357, it moves with the pickup arm as the sound groove on the record carries said pickup arm toward the spindle and the follower 336 toward the wall 339, the completion of this motion resulting in another record changing cycle as previously outlined.

When a 12-inch record is deposited on the turntable T, a latch mechanism is actuated. It provides for swinging the switch 346 from the 10-inch record position, in which it is represented by full lines (Fig. 6), to the 12-inch record position, represented by broken lines. The latch is supported from the base plate 55 and is so positioned, with respect to the turntable T, that when a 10-inch record is manipulated with respect to the turntable, this size of record fails to engage the latch mechanism.

In detail, the latch mechanism comprises a latch frame 364 (Figs. 1 and 2) which is bolted to the plate 55 adjacent an aperture 366 therein. The frame 364 is of generally L-shaped formation, being preferably of sheet metal. At one end thereof, the frame 364 includes a pair of upstanding ears 367 adapted to embrace arms 368 and 369 of a U-shaped toggle member 371, the same being in pivoted relationship to the frame by a pin 372 passing through the ears 367 and arms 368 and 369. Toward one end and at the upper edge thereof, the arm 369 includes a laterally extending pad or finger 370 adapted to be engaged by a 12-inch record as it is being lowered to the turntable T. The toggle member 371 is adapted to rock about the pin 372 between an upward position indicated in Fig. 2 and a downward position indicated in Fig. 3 by the weight of a 12-inch record as it is deposited on the turntable. The arm 369 also includes a downwardly extending flange 373, one of the edges of which is provided with a pair of notches 374 and 376. A tooth 377, having gently sloping cam sides, is thus provided by the notches 374 and 376. Beside the course through which the tooth 377 is adapted to be carried is a near-vertically extending link 378 pivoted at its lower end at 379 to the lower end of a finger 381, extending downwardly from the side of the frame 364 toward one end thereof. Upwardly and laterally thereof the link 378 bears a pin 382 which is urged into engagement with one of the notches 374 and 376 by a tension spring 383 anchored to the link 378 and a lug 384 struck upwardly from the frame 364. The spring 383 is adequate to retain the arm 369 in either of the positions shown in Figs. 2 or 3. When in its downward position, the lower end of the arm 373 is spaced from the cam wheel 251 by a narrow margin, as is also a plate 386 of resilient metal riveted to the arm 373. The plate 386 is further slotted at 388 to provide a resilient cam or finger 389 while the end of arm 373 is notched at 391 to afford lateral movement for the finger. Furthermore, the finger 389 is so positioned with respect to the course that a lug 392, extending upwardly from the switch 346, is adapted to be carried through, that the lug is adapted to strike the finger 389 and to be thereby deflected, thus moving the switch to the broken line position (Fig. 6). The finger 389 is resilient for the sake of safety, for should the switch 346 stick in its full line and 10-inch record position, the lug 392 would merely bend the finger 389 enough to pass it It will thus be noted, that, when in the broken line position, the switch 346 is adapted to direct the groove 358 around the follower 336, just beyond which the pickup arm is lowered into engagement with the beginning of the sound groove of the 12-inch record on the turntable.

Figures 8, 12:
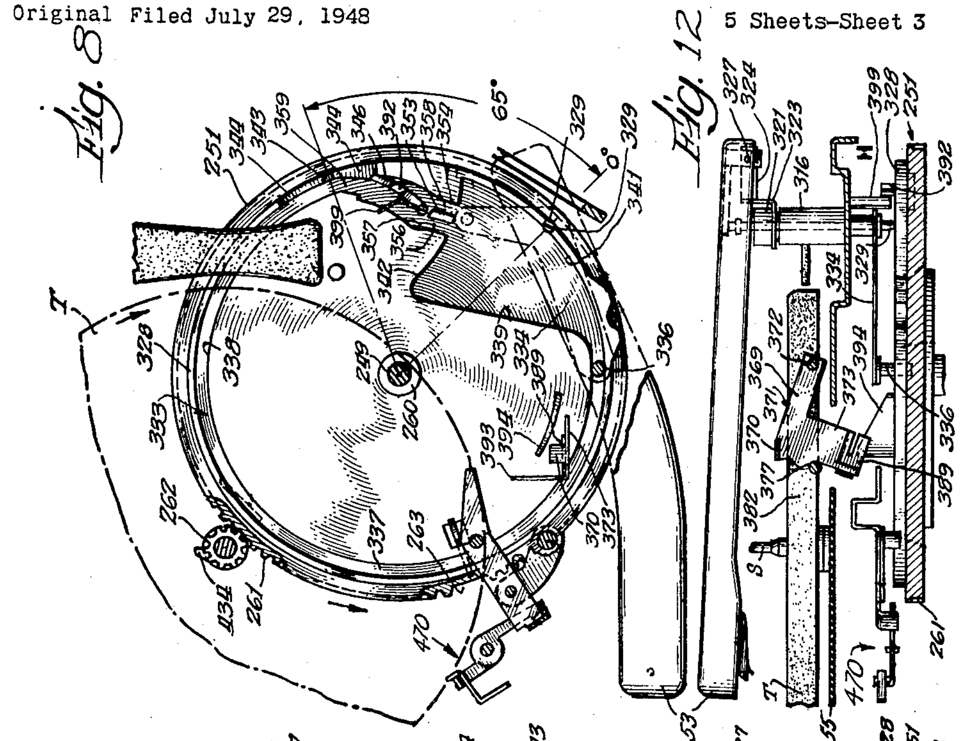
Figure 7:
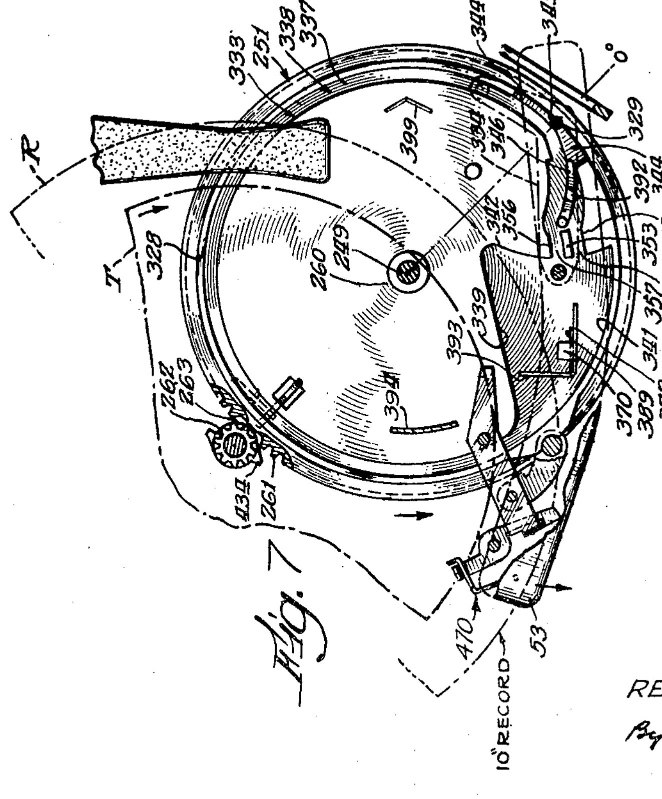
Figure 11:
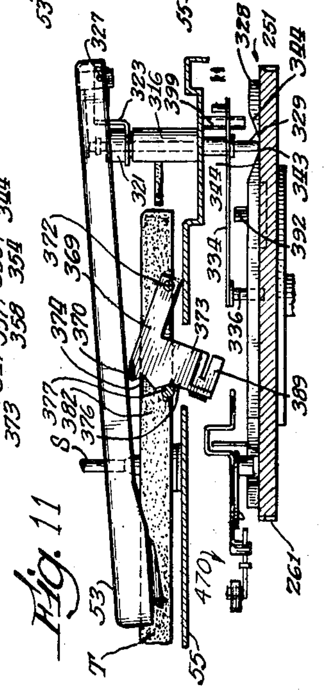
Figures 9, 10, 13, 14:
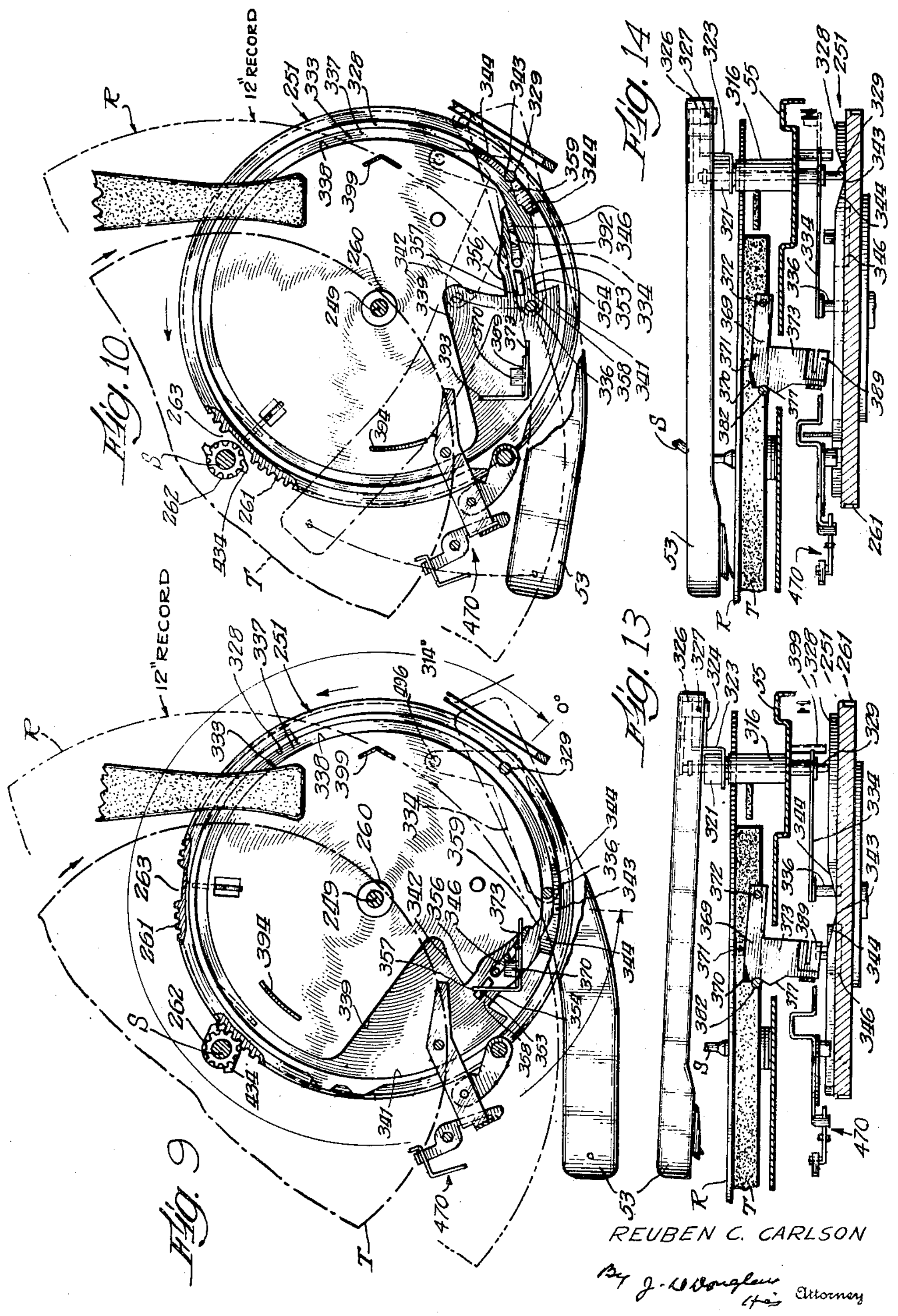

Since it is desirable that the toggle arm 369 be normally in its raised position, means are provided for moving it from the Fig. 3 position, to the Fig. 2 position. To provide for this, the arm 373 includes a reset arm 393, extending laterally from the base thereof, adapted to be engaged by a reset cam 394 (Figs. 3 and 4). The cam 394 is bolted to the cam wheel 328 and includes an upstanding portion 396 which is segmental of an arc about the axis of wheel 251. The cam 394 also includes a slanting cam surface 397 adapted to be passed under the reset arm 393 and by which the arm 371 is adapted to be lifted to its normal position (Figs. 2 and 12). Additionally the reset arm 393 is notched at 398 (Fig. 4) so that the lug 392 may pass under the reset arm.

Provision is also made for returning the track switch 346 to its normal position; that is, the full line position indicated in Figs. 1 and 6. Said provision includes a cam 399 (Figs. 8 and 12) extending downwardly from the base plate 55 to which it is bolted. The cam 399 is V-shaped in transverse cross section, and one of its sides is positioned in the course that the lug 392 is carried through, when the switch is set for let-down of the pickup arm into engagement with the beginning of a 12-inch record. When the track switch is set for manipulation of a 10-inch record (Fig. 7) the lug 392 is adapted to clear the cam 399 in the course of its movement during a record changing cycle.

In Figs. 15 to 19 inclusive is shown an alternative embodiment of mechanism for varying the let-down of the pickup arm 53. The mechanism includes use of a cam wheel 401 in the top surface of which is a groove 402 identical with the groove 333 indicated in Fig. 1 while cam walls 403 and 404 correspond to the walls 342 and 339. Within a widened portion 406 of the grooves 402, at the wall section 403, a switch 407 is adapted to be moved laterally. The switch 407 is of generally rectangular formation and has a tongue 408, transversely of the base thereof, adapted to be slidably received with a slot 409 transversely of the widened portion 406 of the groove. The switch 407 is further anchored to the wheel 401 by a bolt 411 (Fig. 18) passing through the switch 407, wheel 401, a washer 412 resilient washer 413 and nut 414, the relationship between the parts providing just enough friction between the switch 407 and wheel 401 to maintain the switch in whatever position to which it is moved, yet permit ready displacement of the switch to a different position by mechanism provided for this displacement. In order that the switch may be moved, the bolt 411 is provided with an elongated, round head 416 which performs the function of a follower since it is adapted to be engaged by the cam 399 (Fig. 1), to provide for one extreme position (Fig. 15) and by the cam 389 (Fig. 3) to position the switch in its other extreme position (Fig. 16). By movement of the switch 407 to either of its extreme positions different exit grooves 417 and 418 are provided which are adapted to guide the follower 336 into the respective positions for a 10-inch and/or a 12-inch record let-down.

Thus it is apparent that either of the embodiments provides alternate positioning grooves for the follower 336 and therefore alternate let-down positions for the pickup arm. It will be obvious that the records could be any two alternative sizes, as for instance 7- and 10-inch instead of 10- and 12-inch, the latter sizes having been chosen as illustrative only.

Having thus described my invention, I am aware that numerous and extensive departures may be made therefrom without departing from the spirit or scope of my invention.

I claim:

1. In a phonograph automatic record player having a frame on which is carried a driven turntable and a pickup arm, said arm being swingable over said turntable; means by which said pickup arm is adapted to automatically engage the beginning of the sound groove of one of either of two sizes of records when placed on said turntable, comprising a cyclically-driven cam wheel, means including a lift cam on said cam wheel for rocking said pickup arm vertically, a follower and means coupled to said frame by which said follower is in fixed angular relationship to said pickup arm, lateral motion cam surface on said cam wheel including a pair of grooves on different radii with respect to the axis of said cam wheel, each of said grooves being arranged to operatively accommodate said follower and to determine the position of said pickup arm when lowered by said lift cam, means by which said pickup arm is adapted to be automatically positioned in accordance with the size of record deposited on said turntable, comprising a track switch movably anchored to said wheel to determine which of said grooves is adapted to be operatively carried, by and past said follower cam, means connected to said frame for shifting said track switch to a predetermined first position thereby providing a first course to accommodate said follower when a record of one size is deposited on the turntable, mobile cam means in pivoted association with said frame, a preset cam carried by said cam wheel having a cam surface arranged to engage said mobile cam and to move it to a predetermined position wherein said mobile cam means is free from engagement with said preset cam whenever said wheel is rotated, said mobile cam being positioned to be engaged and shifted to a second predetermined position by means including the weight of a record of another size when deposited on said turntable, said track switch being engaged with said mobile cam and shifted to a predetermined second position when said cam is in its second predetermined position to thus provide a second course for said follower.

2. In a phonograph automatic record player having a frame on which is carried a driven turntable and a pickup arm, said arm being swingable over said turntable; means by which said pickup arm is adapted to automatically engage the beginning of the sound groove of one of either of two sizes of records when placed on said turntable, comprising a cyclically-driven cam wheel, means including a lift cam on said cam wheel for rocking said pickup arm vertically, a follower, and means coupling said follower is in fixed angular relationship to said pickup arm, lateral motion cam surfaces on said cam wheel including a pair of grooves on different radii with respect to the axis of said cam wheel, each of said grooves being arranged to operatively accommodate said follower and to determine the position of said pickup arm when lowered by said lift cam, means by which said pickup arm is adapted to be automatically positioned in accordance with the size of record deposited on said turntable, comprising a track switch pivoted to said wheel opposite to the groove to determine which of said grooves is carried past said follower, cam means connected to said frame and engageable with the track switch to provide for shifting said track switch to a predetermiend first position thereby providing a first course to accommodate said follower when a record of small size is deposited on the turntable, toggle means including a swingable member anchored to said frame and having a portion for engagement with said track switch, a preset cam carried by said cam wheel and having a cam surface for engagement with said swingable member to move said member to a predetermined position wherein said member is free from engagement with said preset cam whenever said wheel is rotated, means on said swingable member for engagement with a member arranged to shift said member to a second predetermined position by the weight of a record of large size when deposited on said turntable, said swingable member having a portion for engaging said track switch adapted to be shifted to a predetermined second position by engagement therewith when said member is in its second predetermined position, said track switch thus providing a second course for said follower.

3. In a phonograph automatic record player having a frame on which is carried a driven turntable and a pickup arm, said arm being swingable over said turntable; means by which said pickup arm is adapted to automatically engage the beginning of the sound groove of one of either of two sizes of records when placed on said turntable, comprising a cyclically-driven cam wheel, means including a lift cam on said cam wheel for rocking said pickup arm vertically, a follower, and means coupling said follower in fixed angular relationship to said pickup arm, lateral motion cam surfaces on said cam wheel including a pair of grooves on different radii with respect to the axis of said cam wheel, each of said grooves being arranged to operatively accommodate and guide said follower and to determine the position of said pickup arm when lowered by said lift cam, means by which said pickup arm is adapted to be automatically positioned in accordance with the size of record deposited on said turntable, comprising a track switch, said wheel being formed with a slot therein, a tongue including opposed flat surfaces on said switch extending into said slot, said flat surfaces being engaged in said slot to restrain said switch against rotation, a lock member to secure said tongue in said slot, friction means in connection with said lock member and said wheel to provide for said switch being releasably retained in either of two positions into which it is adapted to be shifted to determine which of said grooves is adapted to be operatively carried past said follower, means connected to said frame and disposed for engagement with said track switch to provide for shifting said track switch to a predetermined first position upon rotation of the cam thereby providing a first course to accommodate said follower when a record of one size is deposited on the turntable, mobile cam means in pivotal association with said frame, and a preset member carried by said cam wheel and having a cam surface for engagement with and for movement of said mobile cam means to a predetermined position wherein said mobile cam means is free from engagement with said preset member whenever said wheel is rotated, means for shifting said mobile cam means shifted to a second predetermined position including a portion for engagement with a record of another size when said record is deposited on said turntable, said mobile cam means being disposed for engagement with said track switch adapted to shift said switch to a predetermined second position by engagement therewith when said mobile cam means is in its second predetermined position, said track switch thus providing a second course for said follower.

4. In a phonograph automatic record player having a frame on which is carried a driven turntable and a pickup arm, said arm being swingable over said turntable; means by which said pickup arm is adapted to automatically engage the beginning of the sound groove of one of either of two sizes of records when placed on said turntable, comprising a cyclically-driven cam wheel, means including a lift cam on said cam wheel for rocking said pickup arm vertically, a follower, and means connecting said follower in fixed angular relationship to said pickup arm, lateral motion cam surfaces on said cam wheel including a pair of grooves on different radii with respect to the axis of said cam wheel, each of said grooves being adapted to operatively accommodate and engage said follower and to determine the position of said pickup arm when lowered by said lift cam, means by which said pickup arm is adapted to be automatically positioned in accordance with the size of record deposited on said turntable, comprising a track switch disposed opposite to said grooves to determine which of said grooves is adapted to be operatively carried past said follower, means to provide for bodily movement of said switch substantially radially of said cam wheel, comprising a slot formed in said wheel, a tongue on said switch extending into and engaged in said slot, a bolt extending through said switch and said wheel to shiftably anchor said tongue in said slot, a friction washer and a spring washer on said bolt to provide friction between said track switch and said wheel thereby frictionally holding said switch remaining in whatever position it is shifted, cam means connected to said frame engageable with the track switch to provide for shifting said track switch to a predetermined first position thereby providing a first course to accommodate said follower when a record of small size is deposited on the turntable, toggle means including a vertically swingable member anchored to said frame and and movable to alternate raised and lowered positions with said track switch when in the lowered position and a preset cam for said swingable member carried by said cam wheel and having a cam surface for engagement with and movement of said swingable member to said raised position wherein said member is free from engagement with said preset cam whenever said wheel is rotated, said swingable member having a portion for engagement with a record when in the raised position adapted to be shifted to the lowered position by means including the weight of a record of large size when deposited on said turntable said swingable member having a cam surface being formed to provide angularly inclined planes on opposite sides of a center line through the pivot therefor and spring pressed means supported by said frame and engageable with said cam surface, said track switch being adapted to be engaged and shifted to a predetermined second position by engagement with said swingable member when said member is in its second predetermined position, said track switch thus providing a second course for said follower.

5. In a phonograph automatic record player having a frame on which is carried a driven turntable and a pickup arm, said arm being swingable over said turntable; means by which said pickup arm is adapted to automatically engage the beginning of the sound groove of one of either of two sizes of records when placed on said turntable, comprising a cyclically-driven cam wheel, means including a lift cam on said cam wheel for rocking said pickup arm vertically, a follower, and means connecting said follower in fixed angular relationship to said pickup arm, lateral motion cam surfaces on said cam wheel including a pair of grooves on different radii with respect to the axis of said cam wheel, each of said grooves being arranged to operatively accommodate and engage said follower and to determine the position of said pickup arm when lowered by said lift cam, means by which said pickup arm is adapted to be automatically positioned in accordance with the size of record deposited on said turntable, comprising a track switch, a slot formed in said wheel, a tongue including opposed flat surfaces on said switch extending into and in engagement with the sides of said slot, restraining said switch against rotation, a lock member to shiftably secure said tongue in said slot, friction means in connection with said lock member and said wheel to provide for said switch being releasably retained in either of two positions into which it is adapted to be shifted to determine which of said grooves is adapted to be operatively carried past said follower, means connected to said frame extending into the path of said track switch shifting said track switch to a predetermined first position thereby providing a first course to accommodate said follower when a record of one size is deposited on the turntable, means including a toggle mechanism connected to said frame, said toggle mechanism comprising a cam carrier connected to said frame and arranged to occupy an extreme upward position or an extreme downward position, means anchored to said frame including a resilient member connected to the frame and cam carrier adapted to urge said cam carrier into either extreme position when said carrier member is moved slightly nearer one position than the other position, a preset member carried by said cam wheel having a portion for engagement with said cam carrier and arranged to swing said cam carrier substantially beyond a central position thereby providing for shifting of said carrier to a raised position, a mobile cam carried by said carrier, said carrier having a portion for engagement with a record and being adapted to be moved from said upper position to said lower position by a large sized record when it is deposited on said turntable, said mobile cam being thus carried into a position wherein it is adapted to shift said track switch and thereby provide a second course for said follower.

6. In a phonograph automatic record player having a frame on which is carried a driven turntable and a pickup arm, said arm being swingable over said turntable; means by which said pickup arm is adapted to automatically engage the beginning of the sound groove of one of either of two sizes of records when placed on said turntable, comprising a cyclically-driven cam wheel, means including a lift cam on said cam wheel for rocking said pickup arm vertically, a follower, and means connecting said follower in fixed angular relationship to said pickup arm, lateral motion cam surfaces on said cam wheel including a pair of grooves on different radii with respect to the axis of said cam wheel, each of said grooves being adapted to operatively accommodate said follower and to determine the position of said pickup arm when lowered by said lift cam, means by which said pickup arm is adapted to be automatically positioned in accordance with the size of record deposited on said turntable, comprising a track switch pivoted to said wheel opposite said grooves and movable to different positions to determine which of said grooves is adapted to be operatively carried past said follower, cam means connected to said frame and having a portion disposed for engagement with the track switch to provide for shifting said track switch to a predetermined first position thereby providing a first course to accommodate said follower when a record of small size is deposited on the turntable, a toggle mechanism in association with said turntable, said toggle mechanism comprising a support member connected to said frame, a cam carrier pivoted to said support member, means to releasably retain said cam carrier in either of two positions with respect to said turntable comprising means providing oppositely inclined cam surfaces on said cam carrier, said cam surfaces providing notches on said cam carrier, a toggle link pivoted to said support member, a follower carried by said link, a spring connected to the follower to constantly urge said follower against said carrier member, alternate engagement of said follower with said notches being provided by said cam surfaces when one of said cam surfaces is moved slightly past said follower, said carrier being thus maintained in either an upward or a downward position, a preset cam carried by said cam wheel and having a face arranged to engage the swingable member adapted to provide for movement of said swingable member to said upward position wherein said member is free from engagement with said preset cam whenever said wheel is rotated, said swingable member having a part extending above the turntable and being adapted to be shifted to a downward position by the weight of a record of large size which engages said face when it is deposited on said turntable, said mobile cam having a part for engaging said track switch to shift it to predetermined second position when said member is in its second predetermined position, said track switch thus providing a second course for said follower.

7. In a phonograph automatic record player having a frame on which is carried a driven turntable and a pickup arm, said arm being swingable over said turntable; means by which said pickup arm is adapted to automatically engage the beginning of the sound groove of one of either of two sizes of records when placed on said turntable, comprising a cyclically-driven cam wheel, means including a lift cam on said cam wheel for rocking said pickup arm vertically, a follower, and means coupling said follower in fixed angular relationship to said pickup arm, lateral motion cam surfaces on said cam wheel including a pair of grooves on different radii with respect to the axis of said cam wheel, each of said grooves being arranged to operatively accommodate said follower to determine the position of said pickup arm when lowered by said lift cam, means by which said pickup arm is adapted to be automatically positioned in accordance with the size of record deposited on said turntable, comprising a track switch slidably attached to said wheel opposite to the groove to determine which of said grooves is carried past said follower, cam means connected to said frame and engageable with the track switch to provide for shifting said track switch to a predetermined first position thereby providing a first course to accommodate said follower when a record of small size is deposited on the turntable, toggle means including a swingable member anchored to said frame and having a portion for engagement with said track switch, a preset cam carried by said cam wheel and having a cam surface for engagement with said swingable member to move said member to a predetermined position wherein said member is free from engagement with said preset cam whenever said wheel is rotated, means on said swingable member for engagement with a member arranged to shift said member to a second predetermined position by the weight of a record of large size when deposited on said turntable, said swingable member having a position for engaging said track switch adapted to be shifted to a predetermined second position, by engagement therewith when said member is in its second predetermined position, said track switch thus providing a second course for said follower.

8. In a phonograph automatic record player having a frame on which is carried a driven turntable and a pickup arm, said arm being swingable over said turntable; means by which said pickup arm is adapted to automatically engage the beginning of the sound groove of one of either of two sizes of records when placed on said turntable, comprising a cyclically-driven cam wheel, means including a lift cam on said cam wheel for rocking said pickup arm vertically, a follower and means connecting said follower in fixed angular relationship to said pickup arm, lateral motion cam surfaces on said cam wheel including a pair of grooves on different radii with respect to the axis of said cam wheel, each of said grooves being adapted to operatively accommodate said follower and to determine the position of said pickup arm when lowered by said lift cam, means by which said pickup arm is adapted to be automatically positioned in accordance with the size of record deposited on said turntable, comprising a track switch slidable radially of said cam wheel to said wheel opposite said grooves and movable to different positions to determine which of said grooves is adapted to be operatively carried past said follower, cam means connected to said frame and having a portion disposed for engagement with the track switch to provide for shifting said track switch to a predetermined first position thereby providing a first course to accommodate said follower when a record of small size is deposited on the turntable, a toggle mechanism in association with said turntable, said toggle mechanism comprising a support member connected to said frame, a cam carrier pivoted to said support member, means to releasably retain said cam carrier in either of two positions with respect to said turntable comprising means providing oppositely inclined cam surfaces on said cam carrier, said cam surfaces providing notches on said cam carrier, a toggle link pivoted to said support member, a follower carried by said link, a spring connected to the follower to constantly urge said follower against said carrier member, alternate engagement of said follower with said notches being provided by said cam surfaces when one of said cam surfaces is moved slightly past said follower, said carrier being thus maintained in either an upward or a downward position, a preset cam carried by said cam wheel and having a face arranged to engage the swingable member adapted to provide for movement of said swingable member to said upward position wherein said member is free from engagement with said preset cam whenever said wheel is rotated, said swingable member having a part extending above the turntable and being adapted to be shifted to a downward position by the weight of a record of large size which engages said face when it is deposited on said turntable said mobile cam having a part for engaging said track switch to shift it to predetermined second position when said member is in its second predetermined position, said track switch thus providing a second course for said follower.

References Cited in the file of this patent

UNITED STATES PATENTS

| | | |
|---|---|---|
| 2,435,264 | Ansar | Feb. 3, 1948 |
| 2,529,474 | Stolberg | Nov. 7, 1950 |
| 2,536,453 | Leline | Jan. 2, 1951 |
| 2,637,558 | Fisher | May 5, 1953 |